(12) United States Patent
Liberti et al.

(10) Patent No.: US 10,863,348 B1
(45) Date of Patent: Dec. 8, 2020

(54) SPREAD SPECTRUM SIGNATURE REDUCTION

(71) Applicant: Perspecta Labs Inc., Basking Ridge, NJ (US)

(72) Inventors: Joseph C. Liberti, Basking Ridge, NJ (US); William H. Johnson, Rumson, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 0 days.

(21) Appl. No.: 16/579,380

(22) Filed: Sep. 23, 2019

Related U.S. Application Data

(60) Provisional application No. 62/735,447, filed on Sep. 24, 2018.

(51) Int. Cl.
| | |
|---|---|
| *H04L 27/06* | (2006.01) |
| *H04W 12/00* | (2009.01) |
| *H04B 1/692* | (2011.01) |
| *H04B 1/715* | (2011.01) |
| *H04K 3/00* | (2006.01) |
| *H04B 1/7073* | (2011.01) |

(52) U.S. Cl.
CPC ........ *H04W 12/0017* (2019.01); *H04B 1/692* (2013.01); *H04B 1/70735* (2013.01); *H04B 1/715* (2013.01); *H04K 3/224* (2013.01); *H04B 2201/70715* (2013.01)

(58) Field of Classification Search
CPC . H04L 1/0054; H04L 12/4604; H04L 5/0048; H04L 5/005; H04W 72/0413; H04W 72/0446; H04W 52/146; H04B 7/0691; H04B 7/0404
USPC .......................................... 375/341; 714/795
See application file for complete search history.

(56) References Cited

U.S. PATENT DOCUMENTS

| | | | | |
|---|---|---|---|---|
| 2016/0330721 | A1* | 11/2016 | Park | H04W 72/042 |
| 2018/0098321 | A1* | 4/2018 | Chae | H04L 5/0037 |
| 2018/0324854 | A1* | 11/2018 | Phuyal | H04W 74/085 |
| 2018/0359043 | A1* | 12/2018 | Chan | H04J 11/0036 |
| 2019/0182865 | A1* | 6/2019 | Falahati | H04W 74/085 |
| 2019/0199468 | A1* | 6/2019 | Zhao | H04L 1/1854 |

\* cited by examiner

*Primary Examiner* — Khai Tran
(74) *Attorney, Agent, or Firm* — Heslin Rothenberg Farley & Mesiti P.C.

(57) ABSTRACT

A system and method for secure communications is disclosed which includes a processor(s) of a first appliqué spreading an uplink signal of a user from user equipment, where the first appliqué is coupled to the user equipment, and where the user equipment is connected to a mobile network. The processor(s) frequency shifts the spread uplink signal to maintain orthogonality over the mobile network.

18 Claims, 10 Drawing Sheets

SPREAD SPECTRUM SIGNATURE REDUCTION

BACKGROUND OF INVENTION

Long-Term Evolution (LTE) systems (including handsets or user equipment (UE) and associated radio access networks), originally developed for commercial applications, are being adapted for military uses. The large production volumes of commercial technology and marketplace competition, have led to a degree of integration, miniaturization, lowering of cost, and ease-of-use while dedicated tactical radio has not experienced a similar pace of advances. Rapid technology evolution in the commercial marketplace is also more attractive than tactical radio technology. For example, compact mobile tactical LTE networks (e.g., systems available from PacStar, General Dynamics, Oceus, Harris, etc.) are currently available, enabling tactical units to use (on the move or at the halt) dedicated networks that do not depend on in-country hosts.

Although integrating commercial solutions into tactical solutions provides access to useable technology, integrating consumer functionality into military environments can introduce security concerns. Existing LTE solutions, including those customized for tactical applications, are vulnerable to electronic (and potentially kinetic) threats because these systems typically need to rely on enabling commercial chipsets, which specify the over-the-air waveform, and need to be inter-operable with other equipment. Thus, currently available tactical LTE systems are subject to detection, interception, geolocation, jamming, spoofing and other electronic warfare techniques, putting warfighters at risk.

SUMMARY OF INVENTION

Shortcomings of the prior art are also overcome and additional advantages are provided through the provision of a system for securing communications over a network. The computer system can include: a first appliqué comprising at least one processor, coupled to user equipment connected to a mobile network; the user equipment configured to communicate with Evolved Node B hardware over the mobile network; a second appliqué comprising at least one processor, coupled to the Evolved Node B hardware, configured to receive communications from the user equipment and to process and transmit the communications to the Evolved Node B hardware; and the Evolved Node B hardware, wherein the first appliqué spreads an uplink signal of a user from the user equipment and frequency shifts the uplink signal, so that the spread uplink signal maintains orthogonality over the mobile network, and wherein the second appliqué obtains the spread uplink signal from the user equipment and processes the spread uplink, the processing by the second appliqué comprising: utilizing embedded training sequences to equalize and de-spread each symbol of the spread uplink signal to generate a de-spread and frequency-shifted signal; re-combining the de-spread and frequency-shifted signal using an aggregator to generate a recombined signal; and providing the recombined signal to the Evolved Node B hardware.

In some examples, the user equipment is user equipment of a long-term evolution system. In some examples, the Evolved Node B hardware comprises a base transceiver station. In some examples, the user equipment comprises a mobile handset.

In some examples, the first appliqué spreads an uplink signal utilizing a spreading code unique to the user. The spreading code can be provided to the user equipment by the second appliqué and the spreading code can be provided to the first appliqué by the user equipment.

In some examples, the first appliqué spreads the uplink signal of the user from the user equipment by performing activities comprising: determining a beginning of each uplink (UL) waveform subframe and symbol period in the uplink signal, wherein the uplink signal comprises a waveform; utilizing the beginning of each UL waveform subframe and symbol period to align a spreading code with the waveform; generating, from the uplink signal, a spreading waveform and a local oscillator at a given frequency; embedding the training sequences in the waveform; and applying the spreading waveform and the local oscillator at the given frequency to the waveform with the training sequence to generate the spread uplink signal. The applying can comprise performing a complex baseband modulation. The training sequences added to the waveform can be orthogonal or approximately orthogonal to the waveform. In some examples, the given frequency is selected from the group consisting of: a fixed frequency and a dynamic frequency, wherein the dynamic frequency changes at predetermined times.

Shortcomings of the prior art are also overcome and additional advantages are provided through the provision of a computer-implemented system for securing communications over a network. The method can include: spreading, by one or more processors of a first appliqué, an uplink signal of a user from long-term evolution system user equipment, wherein the first appliqué is coupled to the long-term evolution system user equipment, and wherein the long-term evolution system user equipment is connected to a mobile network; and frequency shifting, by the one or more processors of the first appliqué, the spread uplink signal to maintain orthogonality over the mobile network.

In some examples, the method further comprises: obtaining, by one or more processors of a second appliqué, over the mobile network, the spread uplink signal, wherein the second appliqué is coupled to Evolved Node B hardware, and wherein the Evolved Node B hardware is configured to receive communications from the long-term evolution system user equipment; and processing, by the one or more processors of the second appliqué, the spread uplink signal, wherein the processing comprises: utilizing embedded training sequences to equalize and de-spread each symbol of the spread uplink signal to generate a de-spread and frequency-shifted signal; and re-combining the de-spread and frequency-shifted signal using an aggregator to generate a recombined signal; and providing, by the one or more processors of the second appliqué, the recombined signal to the Evolved Node B hardware.

In some examples, the method further comprises: obtaining, by the one or more processors of a first appliqué, from the long-term evolution system user equipment, a spreading code, wherein the spreading comprises utilizing the spreading code. In some examples, the spreading code is unique to the user.

The method can further comprise: assigning, by the one or more processors of a second appliqué, to the long-term evolution system user equipment, the spreading code. This assigning can include, for example: accessing, by the one or more processors of a second appliqué, an out-of-band channel; and utilizing, by the one or more processors of a second appliqué, the out-of-band channel to assign the spreading code. This spreading can further comprise: determining, by the one or more processors of the first appliqué, a beginning of each uplink (UL) waveform subframe and symbol period in the uplink signal, wherein the uplink signal comprises a waveform; utilizing, by the one or more processors of the first appliqué, the beginning of each UL waveform subframe and symbol period to align a spreading code with the waveform; generating, by the one or more processors of the first appliqué, from the uplink signal, a spreading waveform and a local oscillator at a given frequency; embedding, by the one or more processors of the first appliqué, the training sequences in the waveform; and applying, by the one or more processors, the spreading waveform and the local oscillator at the given frequency to the waveform with the training sequence to generate the spread uplink signal.

In some examples, the training sequence added to the waveform is orthogonal or approximately orthogonal to the waveform.

In some examples, the given frequency is selected from the group consisting of: a fixed frequency and a dynamic frequency, where the dynamic frequency changes at predetermined times.

Shortcomings of the prior art are also overcome and additional advantages are provided through the provision of a computer-implemented system for securing communications over a network. The method can include: obtaining, by one or more processors of a second appliqué, over the mobile network, a spread uplink signal, wherein an uplink signal spread to generate the spread uplink signal originated from long-term evolution system user equipment, wherein the second appliqué is coupled to Evolved Node B hardware, and wherein the Evolved Node B hardware is configured to receive communications from the long-term evolution system user equipment; and processing, by the one or more processors of the second appliqué, the spread uplink signal, wherein the processing comprises: utilizing embedded training sequences to equalize and de-spread each symbol of the spread uplink signal to generate a de-spread and frequency-shifted signal; and re-combining the de-spread and frequency-shifted signal using an aggregator to generate a recombined signal; and providing, by the one or more processors of the second appliqué, the recombined signal to the Evolved Node B hardware.

Systems, methods, and computer program products relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
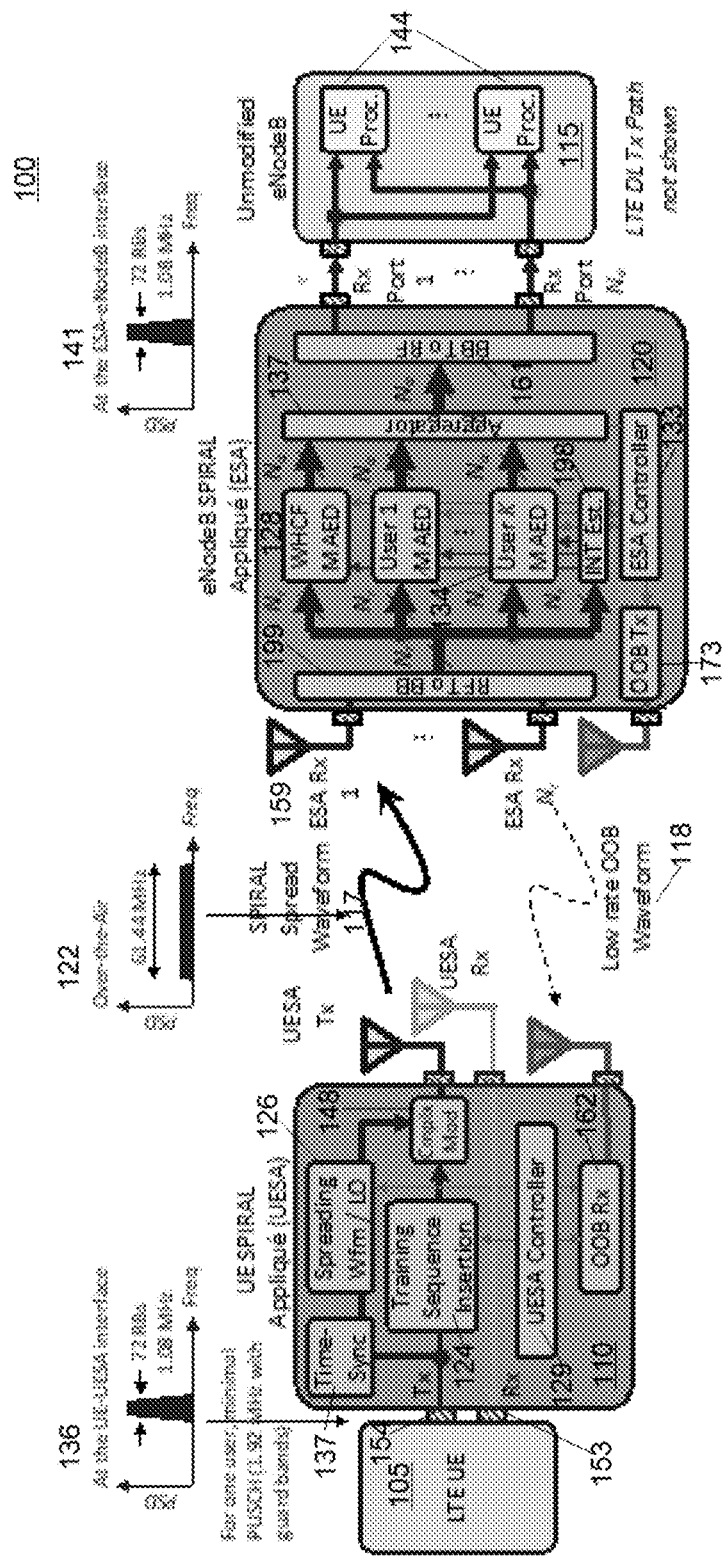
FIG. 1 depicts various aspects of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics professor unit). Additionally, items denoted as processors may include hardware and/or software processors or other processing means, including but not limited to a software defined radio and/or custom hardware.

Embodiments of the present invention include a computer-implemented method, a computer program product, and a system that include program code executed by at least one processing resource that: 1) protects an LTE waveform from interference; and 2) protects the LTE waveform from interceptors. Embodiments of the present invention include program code and/or one or more devices executing program code, that simultaneously lowers the vulnerability of LTE waveforms to detection and geolocation by threat receivers and provides robustness to jamming, while making use of an unmodified LTE UE and E-UTRAN Node B or Evolved Node B (eNodeB). An eNodeB is hardware that is connected to a mobile phone network that communicates directly, wirelessly, with mobile handsets (UEs), including but not limited to, a base transceiver station (BTS). Embodiments of the present invention provide additional security measures in communications that enable, e.g., the military to use commodity commercial equipment. Thus, embodiments of the present invention provide spread spectrum signature reduction for LTE. Although certain implementations that are illustrated herein support LTE, aspects of some embodiments of the present invention also provide protection for other wireless technologies, such as 5G systems, which may use related waveforms.

Embodiments of the present invention include program code implemented on a mobile device utilizing 1) a compact appliqué at the UE; and 2) a corresponding appliqué at the eNodeB. Thus, the program code equalizes and aggregates before presenting to the eNodeB. While some embodiments of the present invention provide spread spectrum signature reduction for LTE related to the uplink, some embodiments of the present invention provide spread spectrum signature reduction for LTE at the downlink. Because of its implementation through appliqué, aspects of various embodiments of the present invention can be utilized with unmodified handsets and base station equipment. Thus, LTE infrastructure and base station equipment can be procured separately and aspects of the present invention can be implemented in the existing infrastructure but these aspects modify the over-the-air waveform sufficiently to provide the required protection, regardless of the existing underlying infrastructure.

A shorthand used throughout this application is "SPIRAL", which stands for spread spectrum signature reduction for LTE. The combination of letters used to form this shorthand does not rely on the first letters of the words, in every case, but the shorthand was created and used throughout to reduce the need to repeat the phrase "spread spectrum signature reduction for LTE."

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to +0.1%, such as less than or equal to +0.05%. If used herein, the terms "substantially", "approximately", "about", "relatively," or other such similar terms may also refer to no fluctuations. To that end, there are various numerical values provided in certain of the figures filed herewith which are provided for the purpose of giving some examples of values relevant to some embodiments of the present invention. They are meant to illustrate and not to limit the values. Even as examples, each value provided is a relative value that is meant to cover the fluctuations described above as well as no fluctuations.

FIG. 1 illustrates an implementation 100 of aspects of an embodiment of the present invention in a mobile device. As depicted in FIG. 1, embodiments of the present invention comprise an appliqué 110 at the UE 105 (a first appliqué) and an appliqué 120 at the eNodeB 115 (a second appliqué). The UE appliqué 110 is also referred to herein as the UE SPIRAL appliqué or the UESA; these terms may be used interchangeably throughout this disclosure. The eNodeB appliqué 120 is likewise referred to by some different terms throughout this application, including the eNodeB SPIRAL appliqué and the ESA.

Returning to FIG. 1, the UE 105 and the eNodeB 115, as noted in FIG. 1, are unmodified. FIG. 1 illustrates how program code executing at the first appliqué 110 spreads 126 the uplink signal 136 of a user (of the mobile computing device 105). In some embodiments of the present invention, the program code executing at the first appliqué 110 can be executed by the UESA controller 129. Program code in embodiments of the present invention frequency shifts (and/or optionally frequency hops), so that spread signals 117 from each UE 105 maintain orthogonality over-the-air 122. Program code executing at the second appliqué 120 processes each UE's 110 spread signal 117 using, for example, the MAED (Multi-Aperture Equalizer/De-spreader) 128, which uses an embedded training sequences to equalize and de-spread each symbol, for each user 134. The program code executing at the second appliqué 120 is executed, in some embodiments of the present invention, by a controller in the second appliqué 120, depicted herein as an ESA controller 133.

The program code re-combines the resulting de-spread and frequency-shifted signals using an aggregator 137, for presentation to the unmodified eNodeB 115 (see, e.g., the second appliqué 120-eNodeB 115 interface 141), of the processing results 144, for each UE. The out-of-band (OOB) control channel 118 allows program code of the eNodeB appliqué 120 to assign spreading codes, to manage frequency assignments, and/or to provide fine-grain close-loop spreading code offset adjustments. Thus, aspects of embodiments of the present invention enables direct sequence cover of the underlying LTE waveform, as well as frequency shifting/hopping. In addition to the illustration in FIG. 2, FIG. 7, which will be discussed herein, illustrates various aspects of the method of the present invention.

Figure 2:
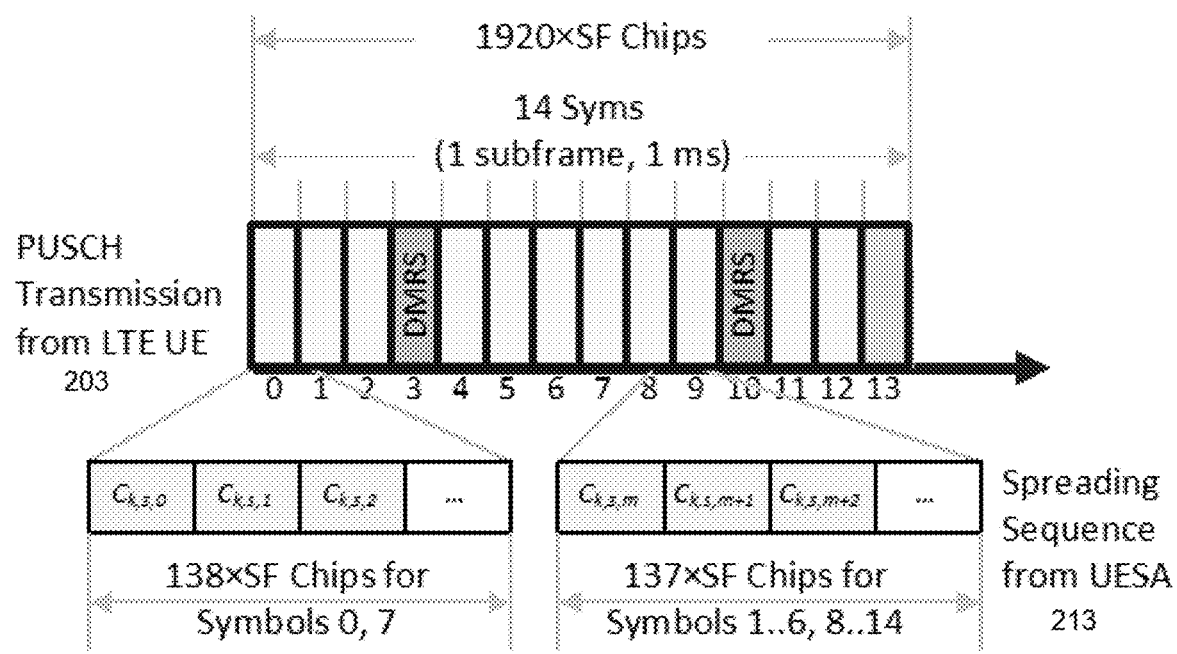
FIG. 2 is an example of an alignment of the spreading code with the transmitted waveform for ASPU computed significant changes in device emanation behavior by program code in some embodiments of the present invention.

FIG. 2 depicts the program code aligning of the spreading code with the transmitted waveform utilizing the Arbitrary Spreading per User (ASPU) approach 200 depicted in FIG. 1. This ASPU approach 200 permits a different spreading code to be applied to each user and enables per-user space time equalization prior to de-spreading, allowing the system to exploit enhanced diversity due to spreading, allowing seamless integration with techniques for interference mitigation. FIG. 2 depicts the processing of a Physical Uplink Shared Channel (PUSCH) transmission form a LTE UE (e.g., FIG. 1, 105) to the spreading sequence from the appliqué (e.g., FIG. 1, 120). Embodiments of the present invention include program code that provides full arbitrary coverage of the LTE waveform, preventing an adversary intercept receiver from exploiting well-known LTE uplink components such as the DMRS (demodulation reference signal) SRS (sounding reference signal), and also preventing an intercept receiver from exploiting cyclic features in the underlying waveform such as via the Schmidl-Cox algorithm. For example, in some embodiments of the present invention, the program code lowers the instantaneous peak power spectral density relative to the unmodified LTE waveform by a factor of 10 log 10(SF) dB (SF is the spreading factor).

Figure 3:
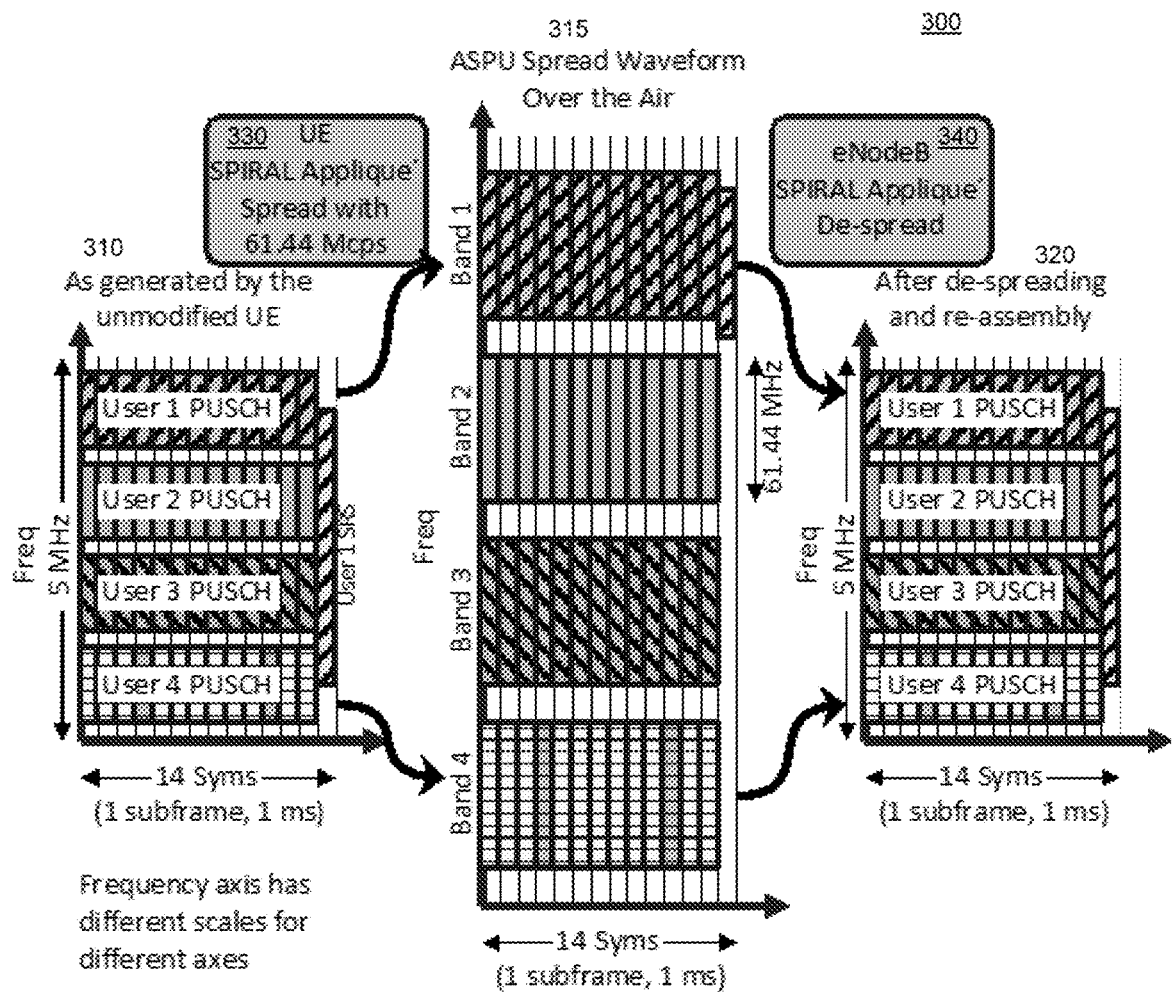
FIG. 3 illustrates ASPU spreading showing a combination of direct sequence and frequency shifts per sub-frame in some embodiments of the present invention.

FIG. 3 depicts this ASPU (approach) 300 to spreading showing a combination of direct sequence and frequency shifts, per sub-frame. Different aspects of the approach 300 are depicted in FIG. 3, from the frequencies as generated by the unmodified UE 310, to the ASPU spread waveform over the air 315, to the after de-spreading re-assembly 320. Four users are provided in this example, each on a Physical Uplink Shared Channel (PUSCH): User 1 PUSCH, User 2 PUSCH, User 3 PUSCH, and User 4 PUSCH. Illustrated in FIG. 3 are also an UE SPIRAL (spread spectrum signature reduction for LTE) appliqué spread 340 and an eNodeB SPIRAL appliqué de-spread 350. As noted in FIG. 3, the frequency axis has different scales for different axes. There are various values provided in FIG. 3 that are examples of values that are relevant to some embodiments of the present invention.

Figure 4:
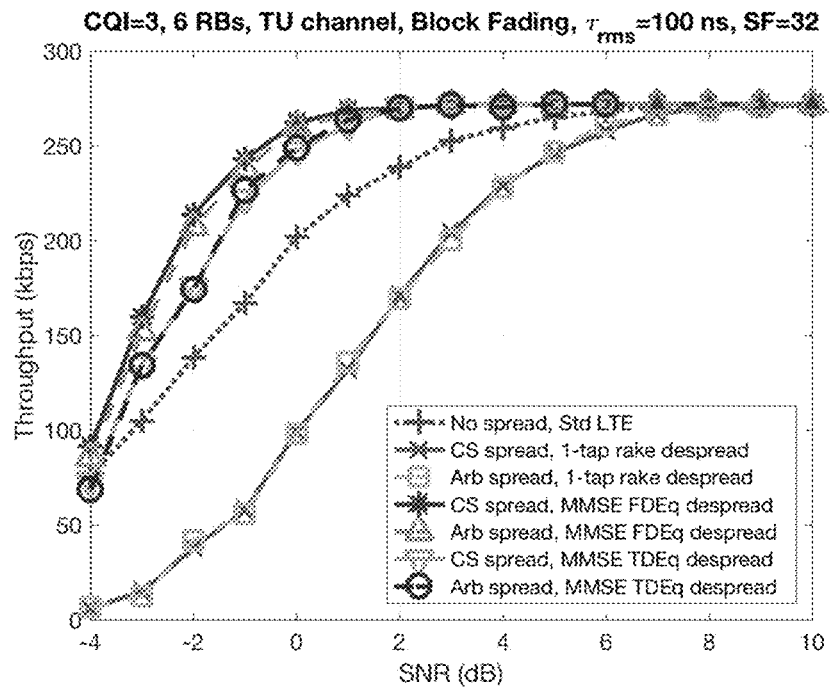
FIG. 4 illustrates the performance of ASPU spreading, as facilitated by program code in various embodiments of the present invention, for a single user with the spreading factor (SF) equal to 32.

As illustrated in FIG. 3, utilizing ASPU 300, in embodiments of the present invention, the program code utilizes a different spreading sequence and an orthogonal frequency hopping pattern, for each user. Orthogonality is maintained between users over the air, thus, the program code in embodiments of the present invention does not introduce co-channel interference, and higher Channel Quality Indicator (CQI) formats can be used. In some embodiments of the present invention, the program code facilitates per-user equalization, prior to de-spreading, as illustrated in FIG. 1. By facilitating per-user equalization, the program code reduces the transmit power per UE (e.g., by approximately 5 dB in the TU channel, relative to the SAS single-tap rake receiver) as shown in FIG. 4, which depicts the performance of ASPU spreading, by the program code, in embodiments of the present invention, for a single user with SF=32, using different receiver structures. In some embodiments of the present invention, the program code applying an embedded training sequence permits per-slot equalization and fast hopping (in some embodiments, up to 14000 times/sec). Embodiments of the present invention provide an advantage over existing appliqué-based approaches, which are limited to hopping at no faster than the sub-frame rate (1000 times per second).

Returning to FIGS. 1 and 3, and as aforementioned, utilizing an ASPU 300 permits a different spreading code 310, 330, 315 to be applied to each user (e.g., User 1, User 2, User 3, and User 4) and enables per-user space time equalization 315 prior to de-spreading 340, allowing the system to exploit enhanced diversity due to spreading, allowing seamless integration with techniques for interference mitigation. In embodiments of the present invention, over the air 112, each user is spread 126, 117 and frequency shifted (hopped) to maintain orthogonality with other users' signals. Hopping on a per-slot basis is enabled by embedded training signals (inserted by the program code of the UE appliqué 110 as a training sequence insertion aspect 124) and per-UE 105 equalization. The eNodeB appliqué 120 works as an aggregator. The program code performs fine time alignment tracking, performing fine offset time alignment 137 (to within something small relative to a chip period for a usable multipath component). The program code that performs the spreading 126, 117 utilizes spreading codes aligned at the UE appliqué 110 with the transmitted waveform, so the spreading-code to DMRS alignment is fixed. However, program code in embodiments of the present invention can utilize arbitrary spreading codes. When assigning spreading codes, the program code can assign a single code to all users in a cell, as Cell-Specific Spreading Codes (CSSC), or a single code across the whole system, as Universal Spreading Codes (USC). Thus, each user is assigned a code/frequency offset (or hop sequence), that it uses in all cells. With CSSC, program code executed by each UE appliqué 110 manages its own codes. As each UE 105 occupies a distinct band after spreading, the technique does not introduce additional Co-Channel Interference (CCI), thus, the program code can utilize high CQI formats. In some embodiments of the present invention, the codes utilized by the program code of each UE appliqué 110 are stored in a central location, a common pool, including but not limited to a resource of a shared computing environment, such as a cloud computing environment, and the resource can be utilized or referenced for cell switch and hand-off.

In embodiments of the present invention, the UE appliqué 110 does not introduce significant latency to an uplink transmission. In some embodiments, before an eNodeB appliqué-specific code/frequency (CF) is assigned by the program code, the program code spreads Physical Random Access Channels (PRACHs) utilizing eNodeB appliqué 120 watering holes, spreading code/frequency combinations (the WHCFs 128), although there may be collisions between the PRACHs generated by different users on the WHCF 128.

In some embodiments of the present invention, the program code performs per-UE equalization before de-spreading, using the code-aligned DMRS and/or embedded training sequences. Some embodiments of the present invention perform joint per-UE equalization and spatial processing. Although each user occupies a distinct subband over the air, so the users and the bands do not instantaneously cover each other, the users and bands can combine with frequency hopping, and can use decoys.

The second appliqué 120, the eNodeB appliqué in FIG. 1, in one embodiment of the present invention (offered by way of example) operates with SF=32 (utilizing a chip rate of 61.44 Mchips per second and a nominal bandwidth of about 61.44 MHz). As understood by one of skill in the art, in FIG. 1, 61.44 Mchip/sec is shown for reference, but other spreading rates (higher and lower) are possible, utilizing aspects of various embodiments of the present invention. Some embodiments of the present invention include a second appliqué, which utilizes multiple antennas. In embodiments of the present invention with eNodeB appliqué multi-antenna operation, at a receiver, for each user, the program code determines the fast Fourier transform (FFT) (i.e., an algorithm that samples a signal over a period of time (or space) and divides it into its frequency components) of each useful part of the signal (for multiple antennas), so that the received signal corresponding to FFT frequency bin m is:

$$\tilde{y}_m = h_{X,k,m}\tilde{x}_{k,m} + h_{V,m}\tilde{v}_m + \tilde{n}_m \quad (1)$$

In (1) above, $\tilde{x}_{k,m}$ is the DFT representation at subcarrier m of signal-of-interest (SOI), $\tilde{v}_m$ is a jamming signal, and $\tilde{n}_m$ is noise. The spatial signatures are $\{h_{X,k,m}\}$ and $\{h_{V,m}\}$ for SOI k and jammer, respectively at subcarrier m. A frequency domain vector (array) weight for subcarrier m is applied. In the simulation, where the channels $\{h_{X,k,m}\}$ and $\{h_{V,m}\}$ are known, the program code can obtain the Minimum Mean Square Error (MMSE) weight vector in the presence of a jamming signal via:

$$w_m = (h_{X,k,m}h_{X,k,m}{}^H P_{X,k,m} + h_{V,m}h_{V,m}{}^H P_{,m} + I_{N_r,N_r}\\
P_{N,m})^{-1}h_{X,k,m}P_{X,k,m} \quad (2)$$

In (2) above, $P_{X,k,m}$ is the received power from k, where $P_{V,m}$ is the received power from jammer, and $P_{N,m}$ is the noise power. Under slow-hopping conditions, if the program code does not track the channel, the program code can generate a correlation matrix based implementation, obtaining the equalized (and interference-nulled) signal is obtained by:

$$\tilde{z}_m = w_m{}^H \tilde{y}_m \quad (3)$$

In some embodiments of the present invention, the program code converts the signal back into the time domain (via IDFT), and de-spread using the chip sequence $a_k(t)$. The program code re-aggregates the resulting signals from all users to reconstitute the signal that the eNodeB Rx modem is expecting.

In some embodiments of the present invention, at the second appliqué, the eNodeB appliqué in FIG. 1, latency is introduced by the program code during a space-time equalization process. For frequency-domain equalization, the program code processes integers comprising SC-FDMA symbols, enabling the program code to process the signal and prepend the cyclic prefix As depicted in FIG. 3, various embodiments of the present invention include program code that spreads physical uplink channels, including but not limited to, Physical Uplink Shared Channel (PUSCH), Physical Uplink Control Channel (PUCCH), and/or Physical Random Access Channel (PRACH). In some embodiments of the present invention, the program code achieves spreading rates of 1.92, . . . , 61.44 Mcps. The value 1.92, . . . , 61.44 Mcps refers to 1.92 to 61.44 Megachips/sec, which is spread spectrum terminology referring to the number of spreading symbols (or chips) in millions per second. The term "chip" is used rather than "symbol" because each chip does not convey information, but is instead a variation applied to the waveform (e.g., multiplying by +/−1 for a chip duration) to spread the bandwidth and enable reception only by a receiver with knowledge of the same chip sequence. In some embodiments of the present invention, for a six (6) resource block PUSCH allocation (72 occupied carriers), the chips rates achieved by the hardware and software (e.g., program code) correspond to spreading factors of SF=1.8, . . . , 56.9 or 2.5, . . . , 17.6 dB, before accounting for additional gain due to hopping. SF=1.8, . . . , 56.9 or 2.5, . . . , 17.6 dB is the spreading factor, first in linear terms (1.8, . . . 56.9) and in decibels (2.5, . . . , 17.6 dB). The spreading factor defines the amount of bandwidth expansion relative to the original unspread signal, so that if the original signal has a bandwidth B, then the spread version will have bandwidth SF×B. This is also the amount that the power spectral density is reduced. If the original signal has power spectral density S, then the spread power spectral density is S/SF.

Figure 5:
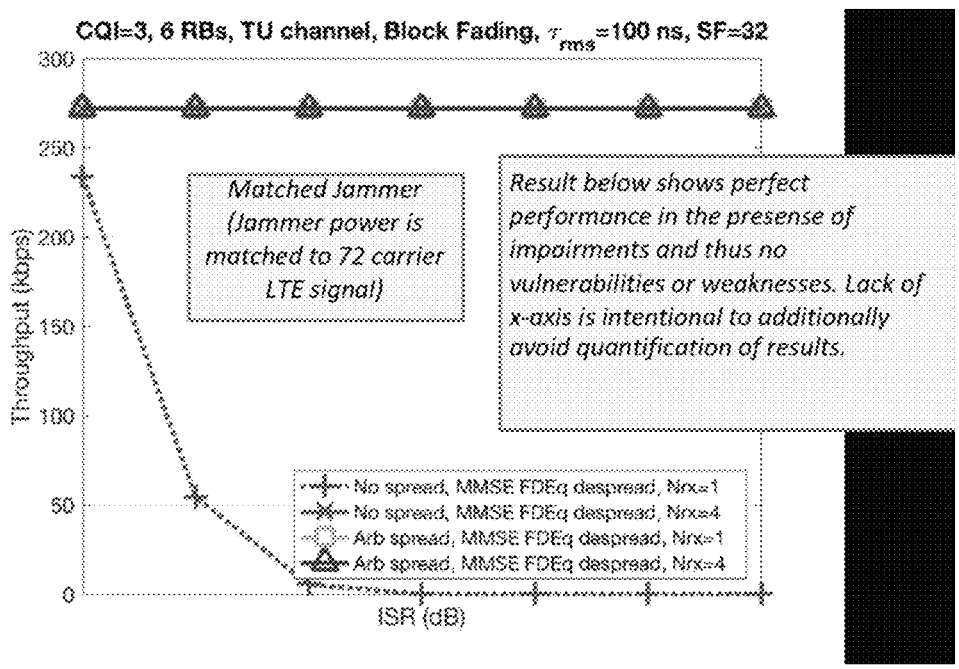
FIG. 5 illustrated the performance of the ASPU receiver with a single user, in some embodiments of the present invention, where $N_{rx}=1$ and 4 (with and without spreading).

Aspects of various embodiments of the present invention protect an LTE waveform from interference. Embodiments of the present invention provide advantages over un-modified LTE systems by lowering the vulnerability of LTE waveforms and protecting the waveforms from interference, as illustrated in FIG. 5. FIG. 5 illustrates the performance of the un-modified LTE system in the presence of a barrage jammer, as well as performance of the system utilizing the spreading (e.g., SF=32) aspect of embodiments of the present invention. With spreading, as facilitated by program code it embodiments of the present invention, the system operates with full throughput in the presence of jamming. The utilization of ASPU by the program code permits seamless integration of the appliqué and accompanying hardware and software components into the LTE system, enabling the program code to mitigate multi-aperture interference. For a four aperture receiver (e.g., using a SISO LTE transmission mode), embodiments of the present invention can operate with full throughput (272 kbps) in the presence of jamming with or without spreading.

Aspects of some embodiments of the present invention protect an LTE waveform from interceptors. In embodiments of the present invention, the program code provides arbitrary spreading, which protects the waveform from interceptors designed to detect LTE UL (uplink) components such as the DMRS and/or SRS. As aforementioned, embodiments of the present invention, the program code also covers the cyclic prefix, preventing vulnerability to Schmidl-Cox type detectors. In one non-limiting example of an embodiment of the present invention, the program code offers further reductions in detectability by allowing the transmitter to operate at up to 2.5 dB lower total transmit power for CQI=3 compared with un-spread LTE. As understood by one of skill in the art, this benefit is obtained through exploitation of additional diversity, as shown in FIG. 4 (e.g., for a minimal PUSCH occupying 72 adjacent subcarriers).

In some embodiments of the present invention, aspects of the present invention can be utilized in-band decoy transmitters. In these implementations, program code in the eNodeB appliqué cancels (by subtracting) the additive interference of the decoys, so they do not degrade performance of the desired link, but they severely degrade the ability of intercept receivers to detect and geo-locate protected emitters. In some embodiments of the present invention utilizes in these transmitters, frequency hopping is accomplished at a fast rate, including, in some implementations, up to 14000 hops/sec.

Returning to FIG. 1, program code in embodiments of the present invention, including the program code executed in both appliqués 110, 120, protects the LTE uplink, providing protection to vulnerable handsets. Some embodiments of the present invention also protect the downlink, spreading frequencies to provide balanced protection for both link directions. In some embodiments of the present invention, a low rate downlink control channel utilized for spreading code management can be integrated with the downlink spreading function, eliminating the need for the OOB control channel 118.

As discussed above, embodiments of the present invention provide for frequency hopping. Embodiments of the present invention can support various hopping schemes, including: 1) slow hopping, where hops are performed at the subframe rate (1000 Hz) or slower, and equalization is handled by an LTE eNodeB modem Rx handle equalization using the DMRS as-is (e.g., using SAS); and 2) fast hopping where we can hop at the symbol rate (14000 Hz).

In embodiments of the present invention that support fast hopping, embedded training sequences are utilized because embodiments of the present invention only enable two DMRSs per frame. Thus, if hopping occurs at a symbol boundary, the program code utilizes a separate training signal. The program code inserts a training signal (e.g., FIG. 1, 124) that is spectrally orthogonal to the underlying LTE signal and/or one signal on each side. The program code spreads (e.g., FIG. 1, 126) the training signal with the same ASPU waveform and utilizes this signal for equalization. Thus, the program code can strip this signal before aggregation in the ASPU receiver.

As depicted in FIG. 1, in embodiments of the present invention, the program code of the eNodeB appliqué may assign spreading codes, to manage frequency assignments, and/or to provide fine-grain close-loop spreading code offset adjustments and the program code that performs the spreading utilizes spreading codes aligned at the UE appliqué with the transmitted waveform, so the spreading-code to DMRS alignment is fixed. However, for UE spreading, the sequences utilized may be generated at the transmitter per (4) below, where $f_{k,n}$ is the frequency shift used at time n, $\{C_{k,n}\}$ is the chip sequence, and $\phi_{k,n}$ provided continuity. $T_c$ is the chip period, which is assumed to be constant, but could be variable or dithered in future versions.

$$a_k(t) = \sum_{n=-\infty}^{\infty} C_{k,n} \Pi\left(\frac{t - nT_c}{T_c}\right) e^{j(2\pi f_{k,n} t + \phi_{k,n})} \tag{4}$$

As illustrated in (4) above, the frequency shifts are aligned with the frame boundary for slow hopping, or the symbol boundary for fast hopping and the sequences may be programmable. In one example, chip rates of SF×1.92 Mcps for SF=1, 2, 4, 8, 16, and 32 are assumed. For a minimal PUSCH assignment with 6 RBs, occupying 72 adjacent carriers, with an FFT size of 128), an actual spreading gain that is 128/72×SF can be achieved. In some embodiments of the present invention, the offsets in chip frequency for the different nodes are small relative to use of closed loop timing control to track and align the codes. Arbitrary adjustments can be made 10 times per second, such that the offset in frequency is small relative to 10 Hz. High quality oscillators can be utilized to minimize tracking issues. In some types of hopping with ASFU, the program code can insert training references in addition to spreading, as discussed above.

As aforementioned, in ASPU, which is utilized in embodiments of the present invention, the alignment between the spreading sequence and the underlying LTE waveform are fixed so that the DMRSs are registered relative to the spreading sequence. Thus, program code executing at the UE appliqué and the eNodeB appliqué (FIG. 1) both know the sub-frame number s, and that the spreading sequence is aligned so that chip m=0 is aligned with the beginning of each sub-frame. Based on the code assigned to each UE, the program code of both the UE appliqué and the eNodeB appliqué generate the same sequence down to this unknown time offset.

Referring to FIG. 2, in a non-limiting example, offered for illustrative purposes only, there are 1920×SF chips, $\{C_{k,s,m}\}$ for user k, subframe s, m=0, . . . (1920×SF–1), ali eNodeB eNodeB gned (e.g., FIG. 2), where chips (412×SF)+0 . . . (137×SF–1) spread the first DMRS, and chips (1372×SF)+0 . . . (137×SF–1) spread the second DMRS. At the receiver, the program code can form a spread version of the DMRSs expected in each sub-frame. This spread can be used to estimate the channel for the spread waveform. The program code at the UE appliqué recognizes the beginning of each sub-frame, (to set and generate m=0), and the program code at the UE appliqué obtains the sub-frame number s, obtaining timing to an error small relative to 1 ms (e.g., one sub-frame).

Embodiments of the present invention can utilize different spreading sequences. Program code at the UE appliqué or the transmitter can utilize a spreading function that generates a unique spreading sequence $\{C_{k,s,m}\}$. Some embodiments of the present invention may utilize a Gold sequence seeded for m=0, with a seed determined (deterministically) from (k, s).

Embodiments of the present invention handle Random Access Channel (RACH) bursts. The RACH is used by the mobile station to request a dedicated channel from the base station. The RACH is sent on the random access burst, which is the first burst sent to the base station by the mobile station, when a call origination or data connection is attempted. Because embodiments of the present invention utilize ASPU, the RACH burst is spread when the program code of the UE appliqué spreads the RACH burst using $\{C_{k,s,m}\}$ where the first chip is aligned to start at the beginning of the RACH burst. In embodiments of the present invention, the program code of the UE appliqué waits to spread the LTE UE signal until it observes (through monitoring and/or receives a notification of) a transmission from the UE. Upon aligning the first chip with the start of the sub-frame, the program code of the UE appliqué can determine the subframe number s, based on the time to an error being small relative to each sub-frame. By utilizing a clocking component or signal integrated into the UE appliqué, the program code at the UE appliqué identifies a starting burst for each sub-frame and commence generating the spreading sequence per the alignment.

In some embodiments of the present invention, the program code detects the start of a sub-frame transmission by the start of the slot. For example, if there are several slots in a row, the program code can locate the cyclic prefix. In one example, offered for illustrative purposes, if the transmitter is in steady state, at SF=1, there are 138 chips (CP length=10 chips) in the first symbol of the slot and 137 chips (CP length=9 chips) in the next 6 symbols. In some embodiments of the present invention, the program code of the UE appliqué identifies bursts that start at the beginning of a sub-frame, in order to detect the start of the transmission.

Returning to FIG. 1, at the UE, program code in an embodiment of the present invention spreads and frequency converts the UE waveform. In order to accomplish the spreading and converting, in some embodiments of the present invention, a modulator 148 (e.g., complex baseband modulation) upconverts or downconverts the UE signal after spreading 126.

Embodiments of the present invention include certain control functions, such as the ability to define which messages are carried over a channel, to make sure that the rates are suitable for the commercially available off-the-shelf devices utilized. In embodiments of the present invention, the program code of each UE appliqué 110 is pre-configured to recognize a time to an error that is small, relative to each sub-frame, so that the sub-frame number s can be uniquely determined. Since the code is determined by (k, s), pre-configuring the UE appliqué 110 includes providing, from a control device in communication with the UE appliqué 110, with an identifier for each UE which node is (k), such that the program code can determined s from the time.

In order to maintain $\{k\}$ to be unique to each cell, aspects of various embodiments of the present invention determined which k is mapped to which user (e.g., Cell-Specific Spreading Codes, CSSC). In some embodiments of the present invention, $\{k\}$ is common across the pool of all users (i.e., in all cells). However, in some embodiments of the present invention, the program code determines which ks are associated with the users for a particular cell (e.g., Universal Spreading Codes, USC). As the downlink is not modified, the UE can make measurements of surrounding cells as normal, to identify this value. In USC, the program code assigns a k to each user in the system and all eNodeBs look for all spreading codes, such that the eNodeB appliqué continuously monitors for all CFs. For CSSC, certain aspects of the present invention track which users are in which cells and assign them appropriate spreading codes. For example, when an UE switches cells, the program code de-allocates the user from the current cell and assign it a spreading code in the new cell.

The UESA and the ESA can share a mechanism for generating direct sequence and optional spreading sequences so that, given a user identifier k and subframe number s, both nodes can generate identical spreading sequences. For example, the spreading code could be generated using a Gold code sequence generator in which a unique seed is determined by (k,s), from a table, which is pre-determined and shared at both the UESA and the ESA. The Gold code sequence generated from this generator (using the same generator polynomials) will then be the same at both the UESA and the ESA. Because this approach, typical of approaches in commercial applications, is potentially vulnerable to physical layer exploitation, embodiments of the present invention can also use alternative code generation approaches.

Figure 6:
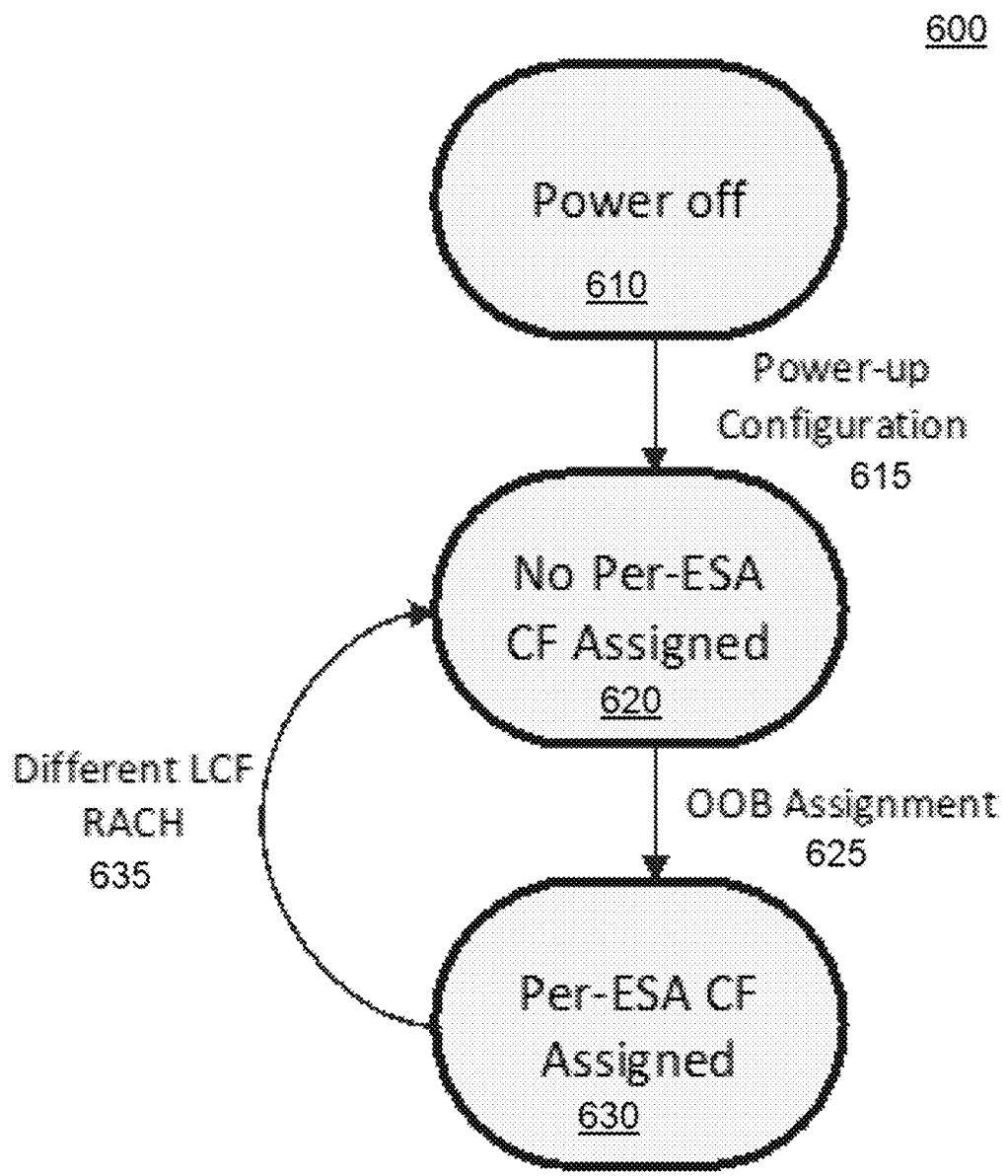
FIG. 6 is a connection state diagram for an appliqué at the user equipment and an appliqué at the E-UTRAN Node B or Evolved Node B (eNodeB), both appliqués being aspects of some embodiments of the present invention.

As illustrated in part by FIG. 6, in embodiments of the present invention that utilize CSSC, to track which users are in which cells and assign them appropriate spreading codes, each eNodeB appliqué includes program code that works as a scanning receiver 600. In some embodiments of the present invention, an UE appliqué transmits a longer probe when it switches cells, allowing the program code to detect, based on the probe, whenever the UE switches frequencies at the UE appliqué. In some embodiments of the present invention, a common watering hole code/frequency (CF) is used by all users to scan. Referring to FIG. 1, as well as FIG. 6, when a user switches cells, it transmits on the watering hole assignment until directed by the OOB link 162 to stop transmission or switch to a UE specific CF assignment. Thus, at configuration 615, e.g., when powered on from a "Power off" state 610, each UE appliqué 110 is assigned a unique code identifying the CF, as well as CFs for valid eNodeB appliqué 120 watering hole spreading code/frequency combinations (the WHCFs 128). If no per-eNodeB appliqué CF has been assigned, the UE appliqué uses the WHCF 128 to transmit all PRACH bursts. Upon receipt of a PRACH burst at the eNodeB appliqué 120, the eNodeB appliqué 120 sends an OOB assignment to the UE to use one of CFs reserved for that eNodeB appliqué 120 and the UE appliqué 110 enters a "Per-eNodeB appliqué CF Assigned" 620 state. In this states, the UE appliqué 110 continues to transmit using the designated CF 625, until a RACH is detected at the UE appliqué 110, from the UE 105, on a different LTE physical center frequency 635. At that point, the UE 105 re-enters the "No Per-eNodeB appliqué CF Assigned State" 630 and uses the WHCF for all transmissions.

Figure 7:
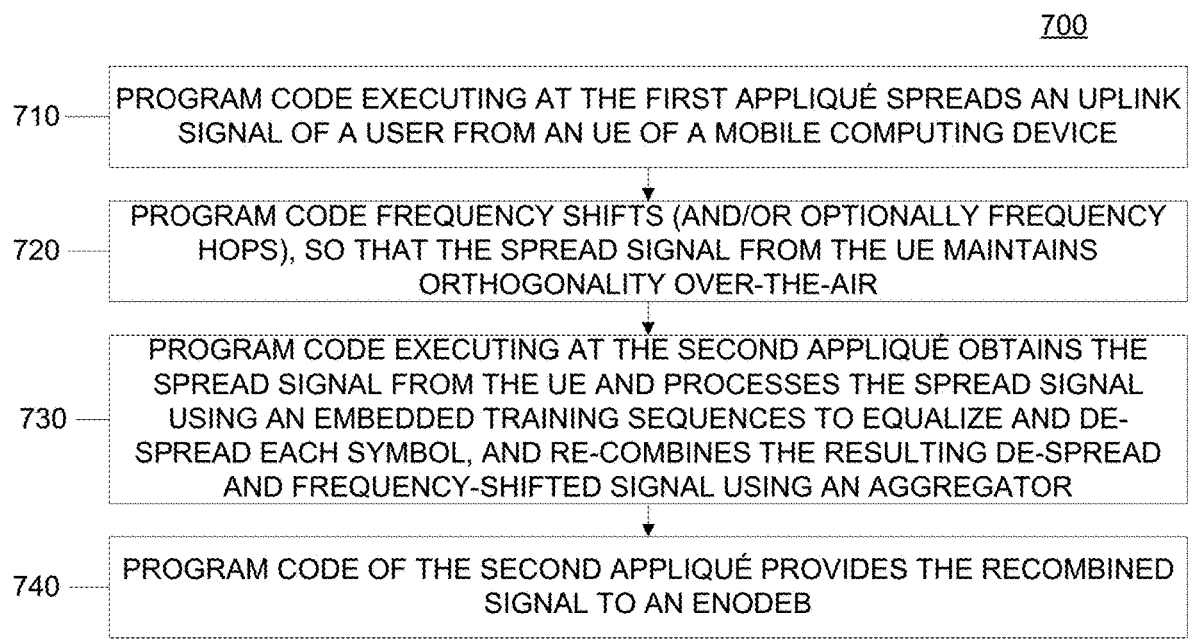
FIG. 7 depicts a workflow illustrating certain aspects of an embodiment of the present invention.

FIG. 7 is a workflow 700 depicting aspects of some embodiments of the present invention. In some embodiments of the present invention, program code executing at the first appliqué spreads an uplink signal of a user from an UE of a mobile computing device (710). The program code frequency shifts (and/or optionally frequency hops), so that the spread signal from the UE maintains orthogonality over-the-air (720). Program code executing at the second appliqué obtains the spread signal from the UE and processes the spread signal using an embedded training sequences to equalize and de-spread each symbol, and re-combines the resulting de-spread and frequency-shifted signal using an aggregator (730). The program code of the second appliqué provides the recombined signal to an eNodeB (740). In some embodiments of the present invention, the program code executing at the first appliqué spreads the uplink signal utilizing a spreading code assigned by the program code utilizing an OOB control channel. In some embodiments of the present invention, the program code at the first appliqué access an OOB control channel to provide fine-grain close-loop spreading code offset adjustments. In some embodiments of the present invention, the spreading code applied is specific to the user. In some embodiments of the present invention, the spreading codes are arbitrary. In some embodiments of the present invention, the spreading codes are obtained from a centralized repository on a shared computing systems, including but not limited to a cloud computing system.

Figure 8:
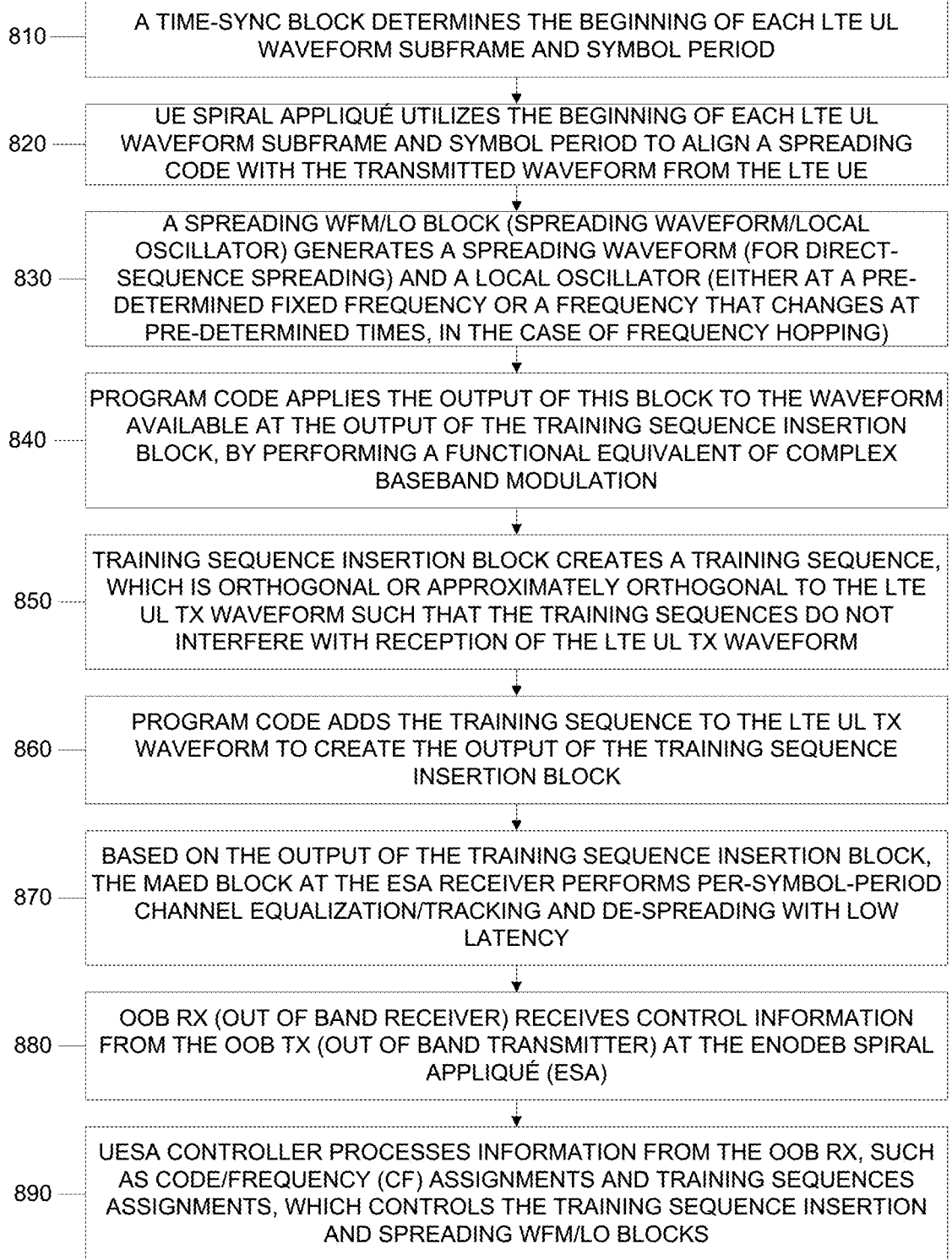
FIG. 8 depicts a workflow illustrating certain aspects of an embodiment of the present invention.
Figure 9:
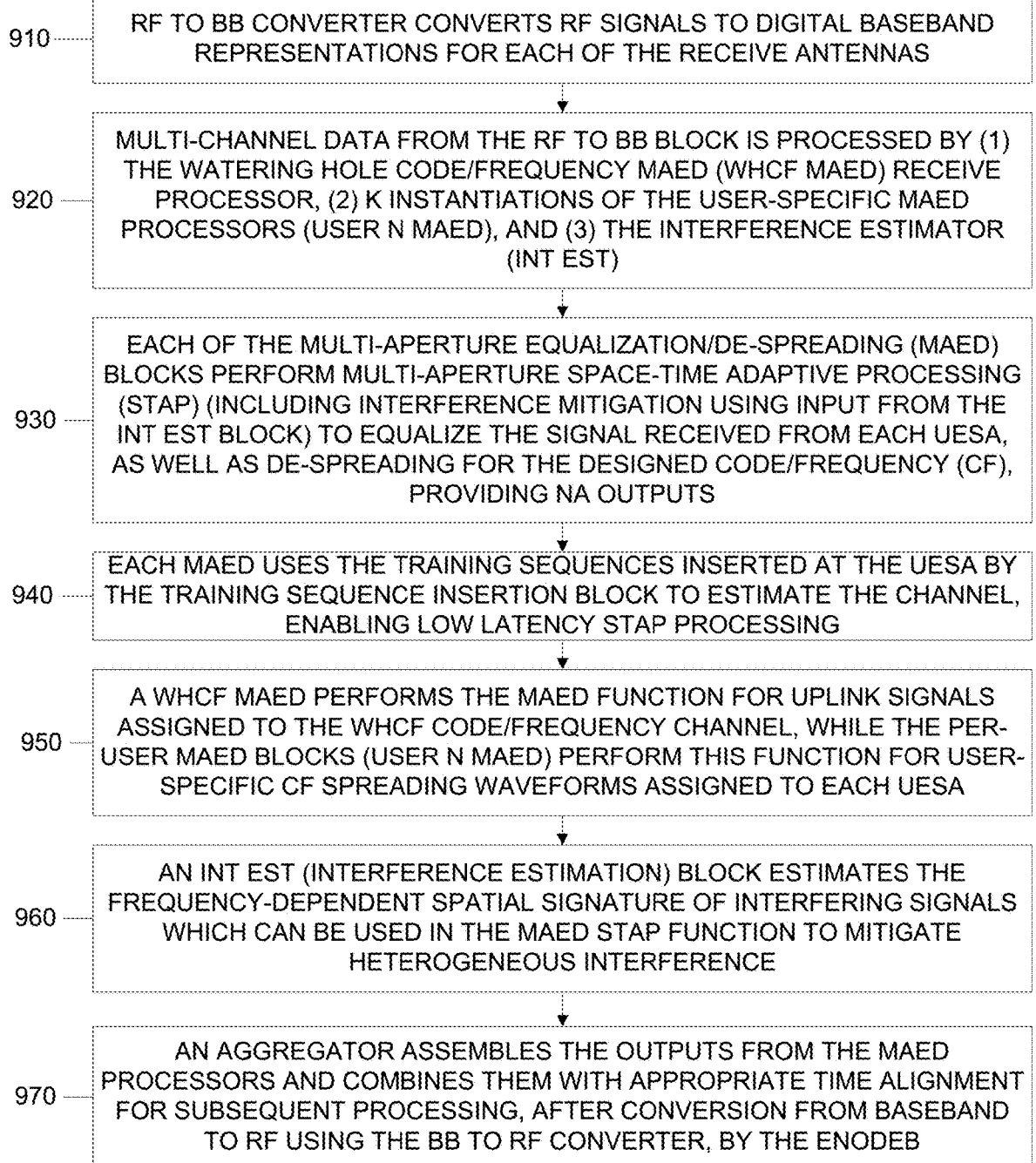
FIG. 9 depicts a workflow illustrating certain aspects of an embodiment of the present invention.

FIGS. 8-9 expand on aspects of this workflow 700, individually in the UE Applique (e.g., FIG. 1, 110) and the eNodeB Applique (e.g., FIG. 1, 120), in various embodiments of the present invention.

FIG. 8 is a workflow 800 that further illustrates certain aspects of some embodiments of the present invention with a focus on aspects performed in the UE Applique 110 and/or by various programs that interact with the UE Applique 110. For illustrative purposes only, references are made to elements of the FIG. 1. This workflow 800 can be understood by referencing aspects of FIG. 1. In some embodiments of the present invention a LTE UE 110 is a COTS (Commercial Off-The-Shelf) UE, which is shown in FIG. 1 with separate transmit 154 and receive 153 antenna ports. In an embodiment of the present invention a Time-Sync block 137 determines the beginning of each LTE UL waveform subframe and symbol period (810). The UE SPIRAL appliqué 110 utilizes the beginning of each LTE UL waveform subframe and symbol period to align a spreading code with the transmitted waveform from the LTE UE (820). This can be accomplished, for example, by determining the time offset of the De-Modulation Reference Symbols (DMRSs) using a cross-correlation between signal from the LTE UE Tx port (the LTE UL waveform) and the expected DMRS waveform. In some embodiments of the present invention, a Spreading Wfm/LO block (Spreading Waveform/Local Oscillator) 126 generates a spreading waveform (for direct-sequence spreading) and a local oscillator (either at a pre-determined fixed frequency or a frequency that changes at pre-determined times, in the case of frequency hopping) (830). The program code applies the output of this block to the waveform available at the output of the Training Sequence Insertion block 124, by performing a functional equivalent of complex baseband modulation 148 (the operation can be applied at baseband, IF, or RF) (840). The Training Sequence Insertion block 124 creates a training sequence, which is orthogonal or approximately orthogonal to the LTE UL Tx waveform such that the training sequences do not interfere with reception of the LTE UL Tx waveform (850). The program code adds the training sequence to the LTE UL Tx waveform to create the output of the Training Sequence Insertion block (860). Based on the output of the Training Sequence Insertion block 124, the MAED block at the ESA receiver 159 performs per-symbol-period channel equalization/tracking and de-spreading with low latency (870). The OOB Rx (Out Of Band Receiver) 162 receives control information from the OOB Tx 173 (Out Of Band Transmitter) at the eNodeB SPIRAL Applique (ESA) 120 (880). The UESA Controller 129 processes information from the OOB Rx 162, such as code/frequency (CF) assignments and training sequences assignments, which controls the Training Sequence Insertion 124 and Spreading Wfm/LO 126 blocks (890).

FIG. 9 is a workflow 900 that further illustrates certain aspects of some embodiments of the present invention with a focus on aspects performed in the eNodeB Applique and/or by various programs that interact with the eNodeB Applique. This workflow 900 can also be understood by referencing aspects of FIG. 1. In an embodiments of the present invention, and RF to BB 199 converter converts RF signals to digital baseband representations for each of the Receive Antennas (ESA Rx 1, . . . , ESA Rx $N_r$) (910). The multi-channel data from the RF to BB block 199 is processed by (1) the Watering Hole Code/Frequency MAED (WHCF MAED) receive processor 128, (2) K instantiations of the user-specific MAED processors (User n MAED) 134, and (3) the interference estimator (INT Est) 198 (920). Each of the Multi-Aperture Equalization/De-spreading (MAED) blocks perform multi-aperture Space-Time Adaptive Processing (STAP) (including interference mitigation using input from the INT Est block) to equalize the signal received from each UESA, as well as de-spreading for the designed Code/Frequency (CF), providing $N_a$ outputs (930). Each MAED uses the training sequences inserted at the UESA 110 by the Training Sequence Insertion block 124 to estimate the channel, enabling low latency STAP processing (940). A WHCF MAED 128 performs the MAED function for uplink signals assigned to the WHCF code/frequency channel, while the per-user MAED blocks (User n MAED 134) perform this function for user-specific CF spreading waveforms assigned to each UESA 110 (950). An INT Est (Interference Estimation) block 198 estimates the frequency-dependent spatial signature of interfering signals which can be used in the MAED STAP function to mitigate heterogeneous interference (e.g., jamming) (960). An Aggregator 137 assembles the outputs from the MAED processors and combines them with appropriate time alignment for subsequent processing, after conversion from baseband to RF using the BB To RF converter 161, by the eNodeB (970).

Embodiments of the present invention include a computer system comprising: a first appliqué comprising at least one processor, coupled to user equipment connected to a mobile network; the user equipment configured to communicate with Evolved Node B hardware over the mobile network; a second appliqué comprising at least one processor, coupled to the Evolved Node B hardware, configured to receive communications from the user equipment and to process and transmit the communications to the Evolved Node B hardware; and the Evolved Node B hardware, where the first appliqué spreads an uplink signal of a user from the user equipment and frequency shifts the uplink signal, so that the spread uplink signal maintains orthogonality over the mobile network, and where the second appliqué obtains the spread uplink signal from the user equipment and processes the spread uplink, the processing by the second appliqué comprising: utilizing embedded training sequences to equalize and de-spread each symbol of the spread uplink signal to generate a de-spread and frequency-shifted signal; re-combining the de-spread and frequency-shifted signal using an aggregator to generate a recombined signal; and providing the recombined signal to the Evolved Node B hardware. The user equipment in some embodiment is user equipment of a long-term evolution system. The Evolved Node B hardware, in some examples, comprises a base transceiver station. In some embodiments, the user equipment comprises a mobile handset.

In some embodiments of the present invention, the first appliqué spreads an uplink signal utilizing a spreading code unique to the user. The spreading code can be provided to the user equipment by the second appliqué, and the spreading code can be provided to the first appliqué by the user equipment.

In some embodiments of the present invention, the first appliqué spreads the uplink signal of the user from the user equipment by performing activities comprising: determining a beginning of each uplink (UL) waveform subframe and symbol period in the uplink signal, where the uplink signal comprises a waveform; utilizing the beginning of each UL waveform subframe and symbol period to align a spreading code with the waveform; generating, from the uplink signal, a spreading waveform and a local oscillator at a given frequency; embedding the training sequences in the waveform; and applying the spreading waveform and the local oscillator at the given frequency to the waveform with the training sequence to generate the spread uplink signal. In some embodiments of the present invention, the applying comprises performing a complex baseband modulation. In some embodiments of the present invention, the training sequences added to the waveform are orthogonal or approximately orthogonal to the waveform. In some embodiments, the given frequency is selected from the group consisting of: a fixed frequency and a dynamic frequency, where the dynamic frequency changes at pre-determined times.

Embodiments of the present invention include a computer-implemented method, the method comprising: spreading, by one or more processors of a first appliqué, an uplink signal of a user from long-term evolution system user equipment, where the first appliqué is coupled to the long-term evolution system user equipment, and where the long-term evolution system user equipment is connected to a mobile network; and frequency shifting, by the one or more processors of the first appliqué, the spread uplink signal to maintain orthogonality over the mobile network.

The method can further comprise: obtaining, by one or more processors of a second appliqué, over the mobile network, the spread uplink signal, where the second appliqué is coupled to Evolved Node B hardware, and where the Evolved Node B hardware is configured to receive communications from the long-term evolution system user equipment; and processing, by the one or more processors of the second appliqué, the spread uplink signal, where the processing comprises: utilizing embedded training sequences to equalize and de-spread each symbol of the spread uplink signal to generate a de-spread and frequency-shifted signal; and re-combining the de-spread and frequency-shifted signal using an aggregator to generate a recombined signal; and providing, by the one or more processors of the second appliqué, the recombined signal to the Evolved Node B hardware.

In some embodiments of the present invention, the method further comprises obtaining, by the one or more processors of a first appliqué, from the long-term evolution system user equipment, a spreading code, where the spreading comprises utilizing the spreading code. The spreading code can be unique to the user. The method can also include assigning, by the one or more processors of a second appliqué, to the long-term evolution system user equipment, the spreading code. The assigning can include: accessing, by the one or more processors of a second appliqué, an out-of-band channel; and utilizing, by the one or more processors of a second appliqué, the out-of-band channel to assign the spreading code. The spreading can further include: determining, by the one or more processors of the first appliqué, a beginning of each uplink (UL) waveform subframe and symbol period in the uplink signal, where the uplink signal comprises a waveform; utilizing, by the one or more processors of the first appliqué, the beginning of each UL waveform subframe and symbol period to align a spreading code with the waveform; generating, by the one or more processors of the first appliqué, from the uplink signal, a spreading waveform and a local oscillator at a given frequency; embedding, by the one or more processors of the first appliqué, the training sequences in the waveform; and applying, by the one or more processors, the spreading waveform and the local oscillator at the given frequency to the waveform with the training sequence to generate the spread uplink signal. In some embodiments of the present invention, the training sequence added to the waveform is orthogonal or approximately orthogonal to the waveform. In some embodiments of the present invention, the given frequency is selected from the group consisting of: a fixed frequency and a dynamic frequency, where the dynamic frequency changes at pre-determined times.

Embodiments of the present invention include a computer-implemented method that comprises: obtaining, by one or more processors of a second appliqué, over the mobile network, a spread uplink signal, where an uplink signal spread to generate the spread uplink signal originated from long-term evolution system user equipment, where the second appliqué is coupled to Evolved Node B hardware, and where the Evolved Node B hardware is configured to receive communications from the long-term evolution system user equipment; and processing, by the one or more processors of the second appliqué, the spread uplink signal, where the processing comprises: utilizing embedded training sequences to equalize and de-spread each symbol of the spread uplink signal to generate a de-spread and frequency-shifted signal; and re-combining the de-spread and frequency-shifted signal using an aggregator to generate a recombined signal; and providing, by the one or more processors of the second appliqué, the recombined signal to the Evolved Node B hardware.

Figure 10:
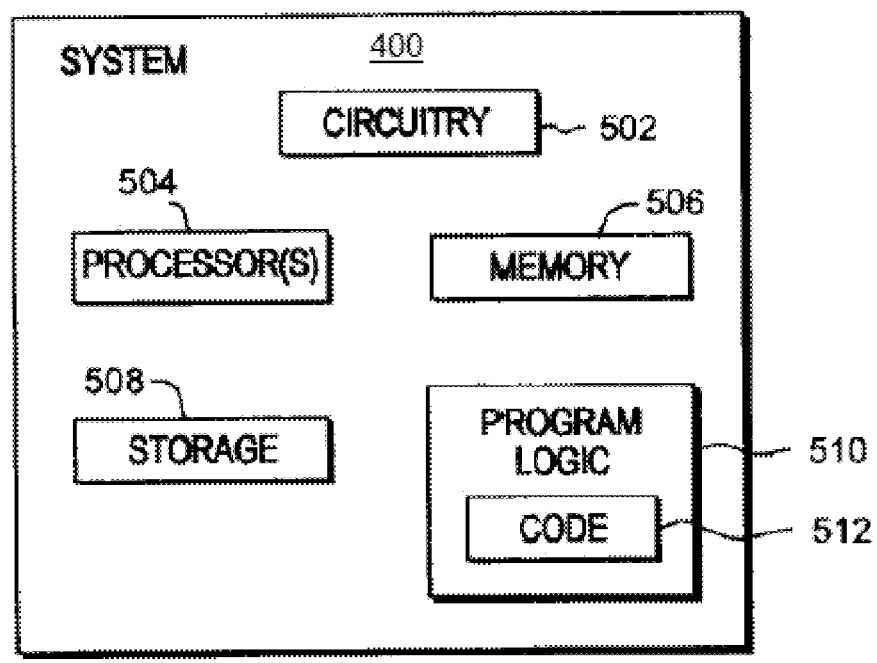
FIG. 10 depicts a computer system configured to perform an aspect of an embodiment of the present invention.

FIG. 10 illustrates a block diagram of a resource 400 in computer system, such as, which is part of the technical architecture of certain embodiments of the technique. Returning to FIG. 10, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 10 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 11:
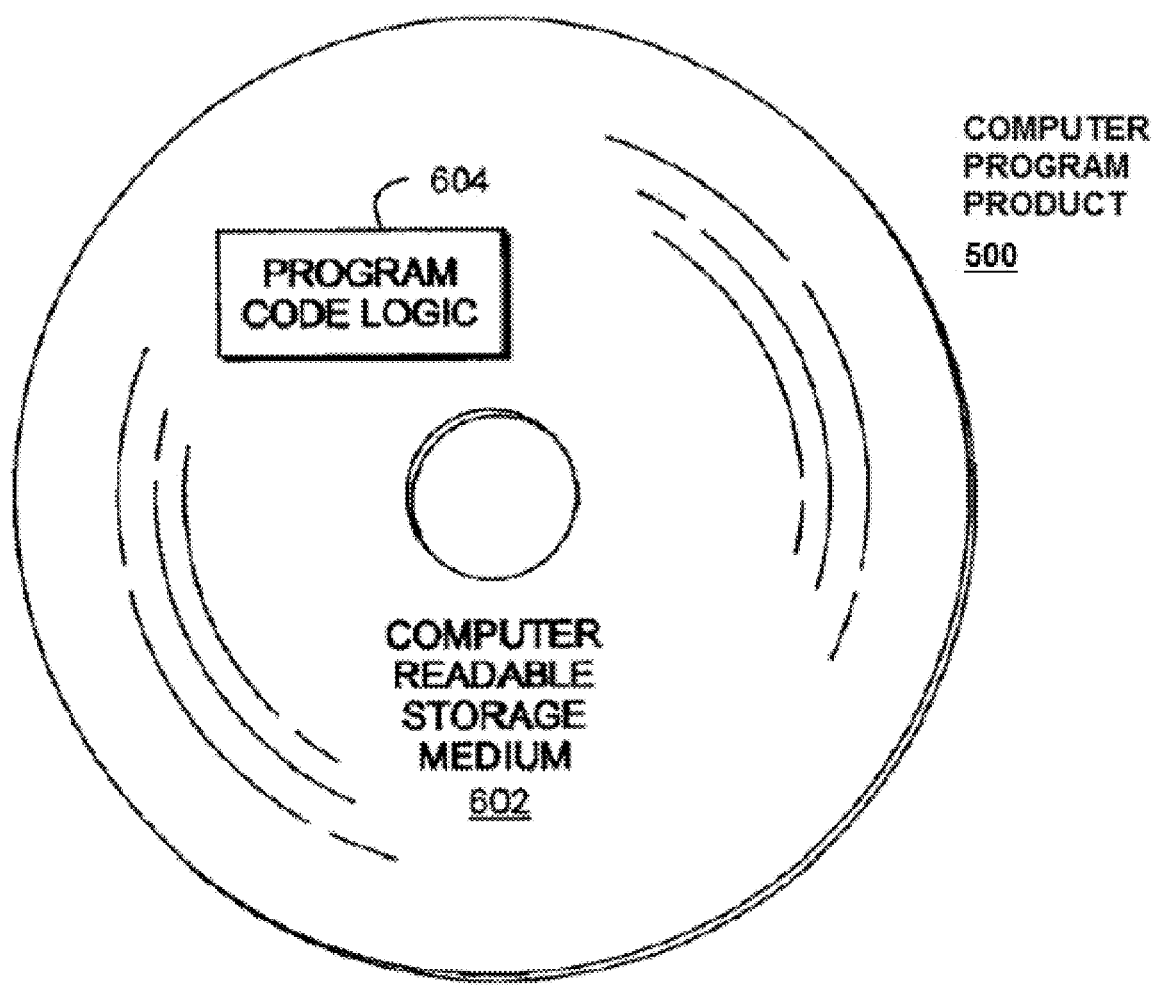
FIG. 11 depicts a computer program product incorporating one or more aspects of the present invention.

Using the processing resources of a resource 400 to execute software, computer-readable code or instructions, does not limit where this code can be stored. Referring to FIG. 11, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Futhermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer system comprising:
a first appliqué comprising at least one processor, coupled to user equipment connected to a mobile network;
the user equipment configured to communicate with Evolved Node B hardware over the mobile network;
a second appliqué comprising at least one processor, coupled to the Evolved Node B hardware, configured to receive communications from the user equipment and to process and transmit the communications to the Evolved Node B hardware; and
the Evolved Node B hardware, wherein the first appliqué spreads an uplink signal of a user from the user equipment and frequency shifts the uplink signal, so that the spread uplink signal maintains orthogonality over the mobile network, and wherein the second appliqué obtains the spread uplink signal from the user equipment and processes the spread uplink, the processing by the second appliqué comprising:
utilizing embedded training sequences to equalize and de-spread each symbol of the spread uplink signal to generate a de-spread and frequency-shifted signal;
re-combining the de-spread and frequency-shifted signal using an aggregator to generate a recombined signal; and
providing the recombined signal to the Evolved Node B hardware.

2. The system of claim 1, wherein the user equipment is user equipment of a long-term evolution system.

3. The system of claim 1, wherein the Evolved Node B hardware comprises a base transceiver station.

4. The system of claim 1, wherein the user equipment comprises a mobile handset.

5. The system of claim 1, wherein the first appliqué spreads the uplink signal utilizing a spreading code unique to the user.

6. The system of claim 5, wherein the spreading code is provided to the user equipment by the second appliqué, and wherein the spreading code is provided to the first appliqué by the user equipment.

7. The system of claim 1, wherein the first appliqué spreads the uplink signal of the user from the user equipment by performing activities comprising:

determining a beginning of each uplink (UL) waveform subframe and symbol period in the uplink signal, wherein the uplink signal comprises a waveform;
utilizing the beginning of each UL waveform subframe and symbol period to align a spreading code with the waveform;
generating, from the uplink signal, a spreading waveform and a local oscillator at a given frequency;
embedding the training sequences in the waveform; and
applying the spreading waveform and the local oscillator at the given frequency to the waveform with the training sequences to generate the spread uplink signal.

8. The system of claim 7, wherein the applying comprises performing a complex baseband modulation.

9. The system of claim 7, wherein the training sequences added to the waveform are orthogonal or approximately orthogonal to the waveform.

10. The system of claim 7, wherein the given frequency is selected from the group consisting of: a fixed frequency and a dynamic frequency, wherein the dynamic frequency changes at pre-determined times.

11. A computer-implemented method comprising:
assigning, by the one or more processors of a second appliqué, to long-term evolution system user equipment, a spreading code;
obtaining, by the one or more processors of a first appliqué, from the long-term evolution system user equipment, the spreading code;
spreading, by one or more processors of a first appliqué, utilizing the spreading code, an uplink signal of a user from the long-term evolution system user equipment, wherein the first appliqué is coupled to the long-term evolution system user equipment, and wherein the long-term evolution system user equipment is connected to a mobile network; and
frequency shifting, by the one or more processors of the first appliqué, the spread uplink signal to maintain orthogonality over the mobile network.

12. The computer-implemented of claim 11, further comprising:
obtaining, by one or more processors of a second appliqué, over the mobile network, the spread uplink signal, wherein the second appliqué is coupled to Evolved Node B hardware, and wherein the Evolved Node B hardware is configured to receive communications from the long-term evolution system user equipment; and
processing, by the one or more processors of the second appliqué, the spread uplink signal, wherein the processing comprises:
utilizing embedded training sequences to equalize and de-spread each symbol of the spread uplink signal to generate a de-spread and frequency-shifted signal; and
re-combining the de-spread and frequency-shifted signal using an aggregator to generate a recombined signal; and
providing, by the one or more processors of the second appliqué, the recombined signal to the Evolved Node B hardware.

13. The computer-implemented method of claim 11, wherein the spreading code is unique to the user.

14. The computer-implemented method of claim 11, wherein the assigning further comprises:
accessing, by the one or more processors of a second appliqué, an out-of-band channel; and utilizing, by the one or more processors of a second appliqué, the out-of-band channel to assign the spreading code.

15. The computer-implemented method of claim 11, wherein the spreading further comprises:
   determining, by the one or more processors of the first appliqué, a beginning of each uplink (UL) waveform subframe and symbol period in the uplink signal, wherein the uplink signal comprises a waveform;
   utilizing, by the one or more processors of the first appliqué, the beginning of each UL waveform subframe and symbol period to align the spreading code with the waveform;
   generating, by the one or more processors of the first appliqué, from the uplink signal, a spreading waveform and a local oscillator at a given frequency;
   embedding, by the one or more processors of the first appliqué, the training sequences in the waveform; and
   applying, by the one or more processors, the spreading waveform and the local oscillator at the given frequency to the waveform with the training sequences to generate the spread uplink signal.

16. The computer-implemented method of claim 15, wherein the training sequences added to the waveform are orthogonal or approximately orthogonal to the waveform.

17. The computer-implemented method of claim 11, wherein the given frequency is selected from the group consisting of: a fixed frequency and a dynamic frequency, wherein the dynamic frequency changes at pre-determined times.

18. A computer-implemented method comprising:
   obtaining, by one or more processors of a second appliqué, over a mobile network, a spread uplink signal, wherein an uplink signal spread to generate the spread uplink signal originated from long-term evolution system user equipment, wherein the second appliqué is coupled to Evolved Node B hardware, and wherein the Evolved Node B hardware is configured to receive communications from the long-term evolution system user equipment; and
   processing, by the one or more processors of the second appliqué, the spread uplink signal, wherein the processing comprises:
      utilizing embedded training sequences to equalize and de-spread each symbol of the spread uplink signal to generate a de-spread and frequency-shifted signal; and
      re-combining the de-spread and frequency-shifted signal using an aggregator to generate a recombined signal; and
   providing, by the one or more processors of the second appliqué, the recombined signal to the Evolved Node B hardware.

* * * * *